(12) United States Patent
Trudeau et al.

(10) Patent No.: US 11,436,677 B2
(45) Date of Patent: Sep. 6, 2022

(54) ELECTRONIC TRADING AND SETTLEMENT SYSTEM FOR BLOCKCHAIN-INTEGRATED CRYPTOGRAPHIC DIFFICULTY-BASED FINANCIAL INSTRUMENTS

(71) Applicant: ERIS DIGITAL HOLDINGS, LLC, Chicago, IL (US)

(72) Inventors: Matthew Trudeau, Brooklyn, NY (US); Joseph McGlawn, Brooklyn, NY (US); Thomas Chippas, New York, NY (US)

(73) Assignee: ERIS DIGITAL HOLDINGS, LLC, Chicago, IL (US)

( * ) Notice: Subject to any disclaimer, the term of this patent is extended or adjusted under 35 U.S.C. 154(b) by 0 days.

(21) Appl. No.: 17/117,052

(22) Filed: Dec. 9, 2020

(65) Prior Publication Data

US 2021/0174442 A1 Jun. 10, 2021

Related U.S. Application Data

(60) Provisional application No. 62/945,505, filed on Dec. 9, 2019.

(51) Int. Cl.
*G06Q 40/00* (2012.01)
*G06Q 40/04* (2012.01)
(Continued)

(52) U.S. Cl.
CPC .......... *G06Q 40/04* (2013.01); *G06Q 20/023* (2013.01); *G06Q 20/0652* (2013.01);
(Continued)

(58) Field of Classification Search
CPC ...................................................... G06Q 40/04
(Continued)

(56) References Cited

U.S. PATENT DOCUMENTS

| 2017/0103458 | A1 | 4/2017 | Pierce et al. |
| 2019/0066206 | A1 | 2/2019 | Marks |
| 2019/0340586 | A1* | 11/2019 | Sheng .................. G06Q 20/367 |

FOREIGN PATENT DOCUMENTS

| WO | WO2019008533 | 1/2019 |
| WO | WO2019015904 | 1/2019 |
| WO | WO2019096333 | 5/2019 |

OTHER PUBLICATIONS

International Search Report in International Patent Application PCT/US2020/064130, dated Mar. 24, 2021.
(Continued)

*Primary Examiner* — Ojo O Oyebisi
(74) *Attorney, Agent, or Firm* — Barich IP Law Group (57) ABSTRACT

A financial instrument trading system is provided which allows for the establishment and trading of cryptographic difficulty-based financial instruments using physical delivery of the underlying cryptocurrency. The cryptographic difficulty-based financial instruments are based on an expected value including the predetermined reward per block of cryptocurrency, a predetermined hashrate, a predetermined financial instrument length, the predetermined nonce value of the underlying cryptocurrency, and the current difficulty level employed by the underlying cryptocurrency, and may vary as the difficulty level varies. The clearinghouse settlement system calculates daily variation margin in valuation of the financial instrument and provides for physical delivery of the underlying cryptocurrency to satisfy the variation margin.

6 Claims, 7 Drawing Sheets

(51) Int. Cl.
  *G06Q 20/06*    (2012.01)
  *G06Q 20/38*    (2012.01)
  *G06Q 20/02*    (2012.01)
  *H04L 9/06*     (2006.01)
  *H04L 9/00*     (2022.01)

(52) U.S. Cl.
  CPC ....... *G06Q 20/0655* (2013.01); *G06Q 20/389* (2013.01); *H04L 9/0637* (2013.01); *G06Q 2220/00* (2013.01); *H04L 9/50* (2022.05); *H04L 2209/56* (2013.01)

(58) Field of Classification Search
  USPC .......................................................... 705/37
  See application file for complete search history.

(56) References Cited

OTHER PUBLICATIONS

Written Opinion of the International Searching Authority in the International Patent Application PCT/US2020/064130, dated Mar. 24, 2021.

\* cited by examiner

FIG. 1

| 210 — Underlying | Bitcoin (BTC) | [Defined as a cryptocurrency] |
|---|---|---|
| 220 — Contract Size | 100 Terahashes per second (TH/s) | [Defined standard hashrate and time] |
| 230 — Price Quotation Format | Gigahashes (GH) of Difficulty | [Units of Difficulty, ie GH, TH, etc.] |
| 240 — Minimum Price Increment | 10 GH | [x Units of Difficulty, ie GH, TH, etc.] |
| 250 — Contract Market Value | Contract market value is calculated as per the formula below.<br><br>$$R = \frac{B * H * S}{D * N}$$<br><br>where,<br>  R is the calculated reward;<br>  B is the reward per block defined by the blockchain protocol for the block interval the contract is listed at;<br>  H is a specified hashrate or hashes per second;<br>  S is the number of seconds over the calculation period;<br>  D is the difficulty level defined by the blockchain;<br>  N is the range of the nonce value for a given blockchain<br><br>For the purposes of this contract, the following parameters will be fixed:<br>H = Contract Size above<br>S = 1,209,600 seconds or 14 days<br>N = 4,294,967,296 | |
| 260 — Expiry Date | Bitcoin difficulty target is reset every 2,016 blocks. The contract will be listed for 12 consecutive resets with an expiry period defined as a Bitcoin block height. | |
| 270 — Settlement Method | Physically Settled | |
| 280 — Settlement Procedures | Variation margin is exchanged daily in the underlying cryptocurrency, ie BTC, determined by the daily contract settlement price.<br><br>Final settlement is based on the difficulty target level published by the Bitcoin blockchain following the difficulty reset at the specified block height. | |

ELECTRONIC TRADING AND SETTLEMENT SYSTEM FOR BLOCKCHAIN-INTEGRATED CRYPTOGRAPHIC DIFFICULTY-BASED FINANCIAL INSTRUMENTS

CROSS-REFERENCE TO RELATED APPLICATIONS

The present application claims the benefit of U.S. Provisional Application No. 62/945,505, filed Dec. 9, 2019, entitled "Electronic Trading and Settlement System for Blockchain-Integrated Cryptographic Difficulty-Based Financial Instruments", which is hereby incorporated by reference in its entirety.]

BACKGROUND OF THE INVENTION

The present invention generally relates to a cryptocurrency trading system. More particularly, the present invention relates to a cryptocurrency trading system that includes physical delivery of cryptocurrency.

A cryptocurrency is a digital asset that may be used as a store of value, or medium of exchange and typically uses a decentralized network to record transactions. The decentralized-network that cryptocurrencies operate on are generally blockchain-based technologies. A blockchain is a series of immutable transactions, a chain of blocks, shared amongst a network of users, and sometimes referred to as a distributed ledger. Distributed ledgers may be either public or private. A private distributed ledger has all transactions validated by designated network participants who typically know and trust each other, and access to the network may be controlled by a central trusted party or parties. A public distributed ledger is one in which there are no restrictions on who may join the network and validate transactions, and which generally has no single person or entity in charge. Transaction validators on public ledgers are often known as miners, and compete with one another to validate transactions in return for some form of compensation.

In order for transactions to be validated and confirmed amongst the network participants, the network must reach a consensus before a group of transactions, or a "block", is added to the chain. The goal of the mechanism by which participants reach a consensus is to have a clear set of rules by which all may agree on the state of the ledger and which transactions are legitimate. There are several consensus mechanisms in existence today, however, one common consensus mechanism is Proof-of-Work (PoW).

The computers on a network running a given blockchain software are also known as nodes. In the PoW model, these nodes are competing to add blocks of transactions to the blockchain by finding a solution to a mathematical problem and getting a reward in return for their work when they find the solution. The reward is newly-created cryptocurrency, and the process is also known as mining. These efforts ensure the blockchain is secure and synchronized across all network participants.

The process of mining has evolved to require specialized computing hardware capable of computing guesses at the solution to the problem in significant volumes at a high rate of speed. The mathematical problem these machines are attempting to solve involves applying a cryptographic hash algorithm to a block of transactions. There are various hash algorithms used across blockchains today such as SHA-256 in Bitcoin, scrypt in Litecoin, and Equihash in Ethereum. The amount of time it takes, on average, to confirm a block is embedded in the blockchain software is designed to maintain speed and stability to the network.

Mining nodes, also known as miners, independently select and group transactions to form a block. A block header is added that summarizes the contents of the block which generally includes data components such as:

Version: software/protocol version number
Previous block hash: reference to the previous block on the chain
Merkle root: the hash of all transactions in the candidate block
Timestamp: block creation time
Difficulty target: a variable threshold value a block hash must be under
Nonce: variable changed in order to achieve an acceptable hash value The challenge of adding one of these blocks to the blockchain is solving the proof-of-work algorithm which involves finding a hash value of the block header data with a numerical value lower than the difficulty target level. All header data components are constant except the nonce. The miner incrementally changes the nonce value and passes the block header data through the hash function until it achieves a hash value below the difficulty target, at which point the miner may demonstrate the "work". Based on the proof of work, other nodes may accept the block, adding it to the chain. The nonce in Bitcoin, for example, is a 32-bit field and as such may include any whole number between 0 and 4,294,967,295.

Miners face multiple uncertainties to profitably running their nodes. First, the success of mining is probabilistic, not deterministic, i.e. actual mining rewards could be above or below the expected reward. The reward itself is deterministic, but winning the reward is like a lottery, determined by odds—over time these should converge around a standard distribution. Second, the fiat-converted price at which a cryptocurrency reward is valued could be above or below a current or expected value as prices fluctuate. Third, the network hashrate, or the measure of processing power online, may vary greatly dependent on the number of nodes coming on or off the network.

All of the variables above are interrelated, and create a feedback mechanism that impacts the odds of mining a block, the value of the reward, and the block confirmation time and thus future difficulty target.

There are various factors miners take into consideration in determining their profitability. Their costs may be fairly well understood as they include capital expenditures such as the mining hardware and space to house them, as well as operating expenditures such as staffing, electricity, etc. that must be paid for in fiat currency. As described above, miners face various uncertainties to their expected future fiat income. However, two important uncertainties include: 1) the amount of cryptocurrency they ultimately produce, and 2) the price at which they may sell that production at once obtained.

BRIEF SUMMARY OF THE INVENTION

One or more of the embodiments of the present invention provide a financial instrument trading system which allows for the establishment and trading of cryptographic difficulty-based financial instruments using physical delivery of the underlying cryptocurrency. The cryptographic difficulty-based financial instruments are based on an expected value including the predetermined reward per block of cryptocurrency, a given quantity of hashrate, a predetermined financial instrument length, a given nonce value range, and the current difficulty level employed by the underlying cryptocurrency, and may vary as the difficulty level varies. The trading system calculates daily variation margin in valuation of the financial instrument and provides for physical delivery of the underlying cryptocurrency to satisfy the variation margin.

DETAILED DESCRIPTION OF THE INVENTION

As described above, miners face various uncertainties to their expected future fiat income including: 1) the amount of cryptocurrency they ultimately produce, and 2) the price at which they may sell that production at once obtained. However, mining may be viewed as the production of cryptocurrency as a commodity. Thus, similar to traditional commodity producers today, miners may highly value a risk management system to incorporate into their operations to help address these risks.

One embodiment of the present invention provides a computer-implemented method of facilitating an exchange and delivery of cryptocurrency based on an estimated, versus realized observed difficulty level, published for a given PoW blockchain.

While the embodiment of the present invention is described within an exchange-traded, centrally-cleared system, terms such as exchange and trading platform refer broadly to a marketplace in which commodities, derivatives, securities and other financial instruments are traded, and includes but is not necessarily limited to exempt boards of trade, designated contract markets, designated clearing organizations, securities exchanges, swap execution facilities, electronic communications networks, and so forth.

The present invention may be employed for all PoW cryptocurrencies including, but not limited to, Bitcoin, Ethereum, Bitcoin Cash and Litecoin. It may also apply to any and all cryptocurrencies with a concept of generating additional cryptocurrency through mining or similar process of reaching consensus.

The difficulty level is deterministically reset after a specified number of blocks. The difficulty reset in Bitcoin for example is every 2,016 blocks. As the difficulty target changes and thus the corresponding expected odds of winning the block reward per unit of hash power decreases, the present invention allows buyers and sellers to exchange the difference in the underlying reward asset, based on the initial estimated reward and the projected reward based on the updated odds. All else equal, as difficulty increases, the expected odds of winning the block reward for a given unit of hash power decreases and thus the buyer would receive the difference in reward values in coin from the seller, and vice versa if difficulty decreases.

Figure 1:
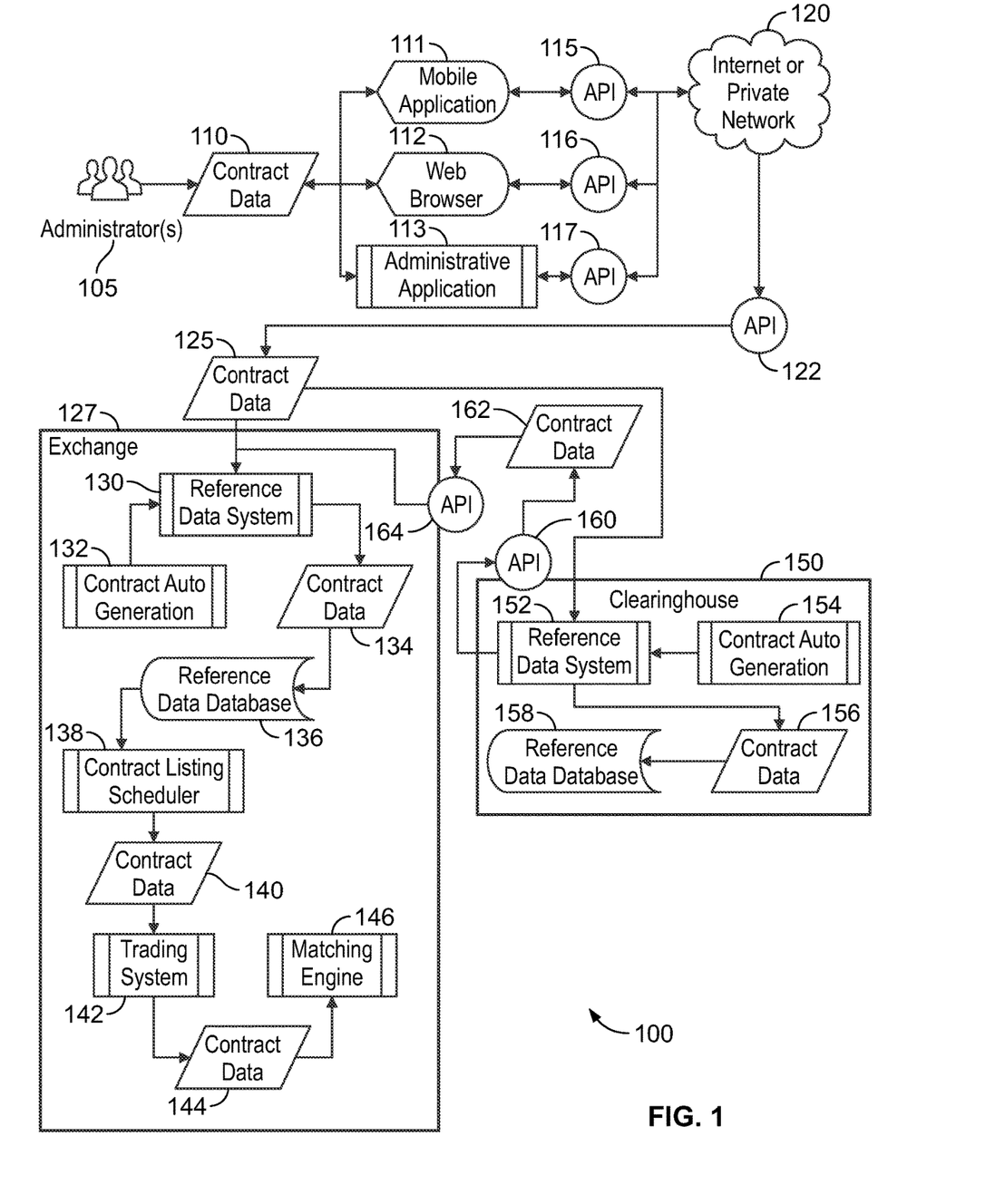
FIG. 1 illustrates a contract listing system 100 according to an embodiment of the present invention.

FIG. 1 illustrates a contract listing system 100 according to an embodiment of the present invention. In general, in the contract listing system 100, individual contract listing data structures comprising a contract listing are created according to a specification, populated with contract data, and added to a reference database for later trading as described below. Additionally, FIG. 2 below illustrates an example of an individual contract listing data structure comprising a listing including example contract data.

In one embodiment, the data for each contract listing is defined and fixed in the contract listing data structure at the time of its creation. Additionally, the reference database is designed to contain a set of fields corresponding to the contract specifications. As further described below, in a first embodiment, the data structures comprising a contract listing may be created and added to a reference database at the exchange reference data system 127, while in a second embodiment, the data structures comprising a contract listing may be created and added to a reference database at the clearinghouse reference data system 150.

More specifically, one or more administrators 105 may enter contract data through a user interface. The user interface may be provided by any of a mobile application 111, web browser 112, or an administrative application 113, each of which may be supported but their own Application Programming Interface (API) 115-117. Although individual APIs are shown in FIG. 1, each of the APIs may be one or more APIs. The contract data 110 may then pass through the internet or a private network 120 and through an API 122 that is able to interface to the exchange reference system 127 and the clearinghouse reference system 150.

In one embodiment, the contract data 125 is passed to the reference data system 130 of the exchange reference system 127. At the reference data system 130, the administrator 105 instructs the reference data system 130 to create a contract listing data structure and then manually populates each of the data fields of the contract listing data structures as shown in the example below in FIG. 2, for example by entering data though a user interface that is transmitted to the reference data system 130. Once the contract listing data structure is populated with contract data, the contract listing data structure is transmitted as contract data 134 to the reference data database 136 and stored.

Figure 2:
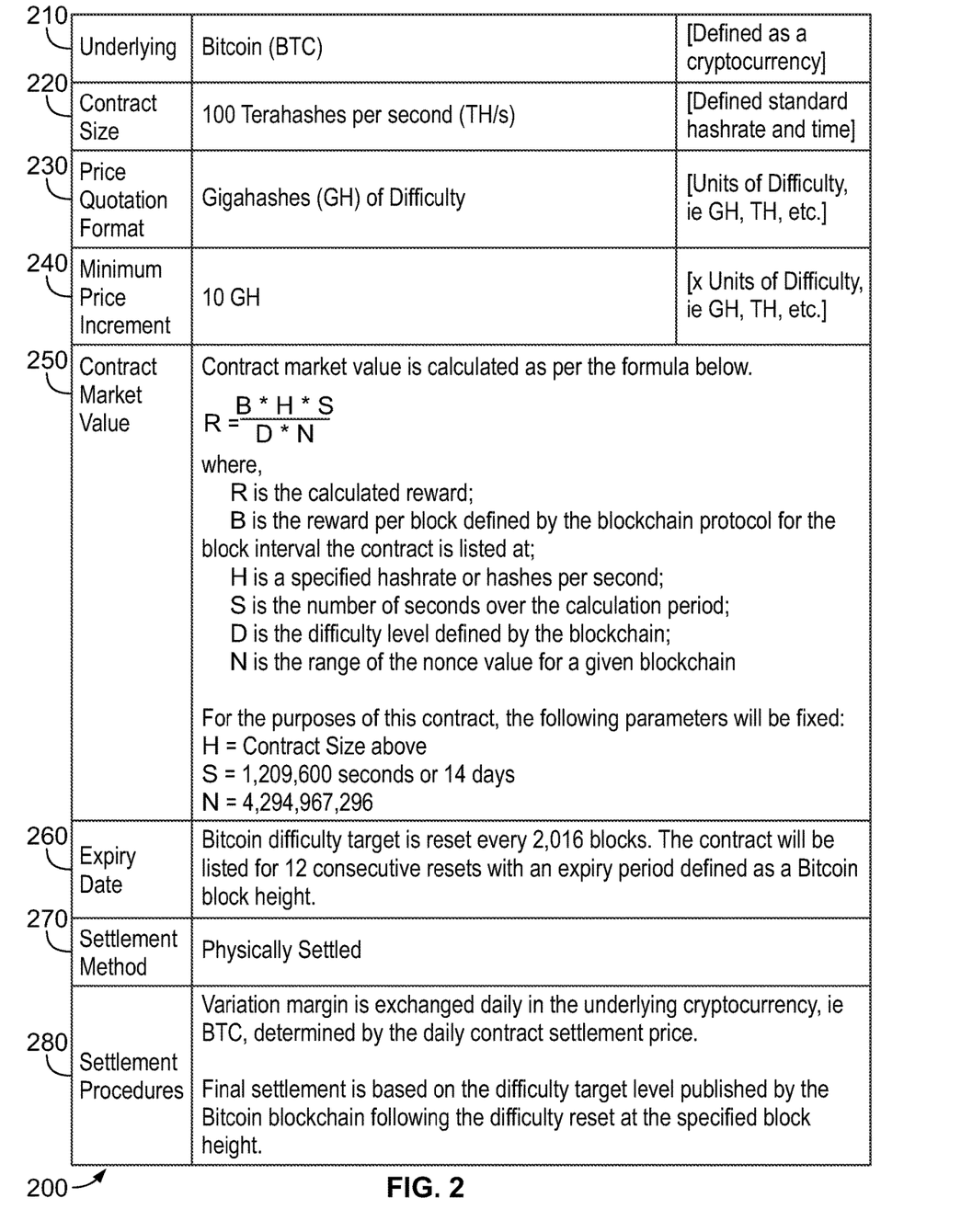
FIG. 2 illustrates an example of an individual contract listing data structure comprising a listing including example contract data.

The exchange reference system 127 also includes the contract auto generation system 132. At the contract auto generation system 132, contract listing data structures may be automatically created in accordance with predetermined specifications and/or scheduling that are programmed into the contract auto generation system 132. For example, for the data fields of the contract listing data structure shown below in FIG. 2, the contract auto generation system 132 may automatically generate a contract listing data structure using a fixed predetermined value for the cryptocurrency data field 210, such as Bitcoin (BTC), the contract size data field 220, such as 100(TH/s), price quotation format data field 230, such as GH, minimum price increment data field 240, such as 10 GH, the expiry date field 260, such as 12 resets, settlement method data field 260, such as physically settled, and settlement procedures data field 270, such as daily variation margin exchange and final settlement based on difficulty level, as shown in FIG. 2 below. In terms of scheduling, on one example the contract auto generation system 132 may create and populate a contract listing data structure every 12 resets, or 24,192 blocks in the BTC blockchain. Additionally, the contract auto generation system 132 may create and populate contract listing data structures of different sizes and frequencies for a specific cryptocurrency. Also, the contract auto generation system 132 may generate different contract listing data structures with different contract data for each individual cryptocurrency. Once a contract listing data structure is generated by the contract auto generation system, the contract listing data structure is transmitted as contract data 134 to the reference data database 136 and stored.

In an additional embodiment, the contract auto generation system 132 may automatically generate the contract listing data structure and populated it with contract data. The contract listing data structure may then be passed to the reference data system 130. At the reference data system 130, the contract listing data structure and/or contract data may be transmitted to the administrator 105 for review, modification, and/or approval. Once the contract listing data structure is approved by the administrator, the contract listing data structure is transmitted as contract data 134 to the reference data database 136 and stored.

Next, at the exchange contract listing scheduler system 138, the contract data structures stored in the reference data database 136 are scheduled for listing on the trading system 142 so as to be made available for trading. At the exchange contract listing scheduler system 138, software instructs the reference data system to publish over a network the contract information 140 to the trading system 142 based upon contract state. The contract listing scheduler system 138 includes a schedule database that contains the data that define events at which the contract state changes through the contract lifecycle. In one embodiment, the contract lifecycle progresses as follows: listing, first trade, last trade, expiry, and delisting. In one embodiment, the each state or event may be a specified date and time, e.g. 4:00 PM Central Time (CT) on Nov. 11, 2019. In another embodiment, each state or event may be a specified blockchain block height, e.g. block 600,768.

In one embodiment of the exchange contract listing scheduler system 138, the administrator 105 may create and add the schedule profile data to a schedule database using an Admin User Interface (UI). In another embodiment, the exchange contract listing scheduler system 138 may automatically create and add schedule profile data to a schedule database based upon a predefined set of specifications. For example, the exchange contract listing scheduler system 138 may retrieve contract listing specifications from the reference data database and schedule events based on the contract listing specifications. For example, the exchange contract listing scheduler system 138 may retrieve the expiry date data field 260 from the contract data structure and use the expiry data to schedule the listing, first trade, last trade, and delisting dates.

In one embodiment, contract listing data structures have data for defined periods at which they are listed for trading and expiry which are recorded in the reference data database at creation. In one embodiment, these data include intervals that are specified in terms of time period, e.g. weekly, monthly, quarterly, etc. In another embodiment, these data include intervals that are specified in terms of difficulty reset period determined by blockchain block height, e.g. first reset, second reset, third reset, etc. Additionally, reset periods and intervals may vary by blockchain.

In another embodiment, instead of the contract data 125 being passed to the reference data system 130 of the exchange reference system 127, the contract data 125 is instead passed to the clearinghouse reference data system 152 of the clearinghouse 150. In operation, the clearinghouse reference data system 152 operates similarly to the exchange reference data system 132. Additionally, the clearinghouse contract auto generation system 154 acts similarly to the exchange contract auto generation system 132. Finally, the clearinghouse reference database 158 operates similarly to the exchange reference data database 136 in storing the contract data 156 received from the reference data system 152.

In operation, contract listing data structures stored in the clearinghouse reference data database 158 may be retrieved from the clearinghouse 150 by the contract listing scheduler 138 at the exchange 127. Contract listing data structures passing from the clearinghouse reference data database 158 traveling to the contract listing scheduler 138 at the exchange 127 pass through the clearinghouse API 160 and are transmitted to the exchange API 164 as contract data 162. The contract listing scheduler 138 may then operate on the contract listing data structures received from the clearinghouse reference data database 158 as described above with regard to contract listing data structures received from the exchange reference data database 136.

At the exchange trading system 142, the contract listing data structures are received from either or both of the exchange reference data database 136 and clearinghouse reference data database 158 in accordance with the scheduled timing determined by the contract listing scheduler 138. The exchange trading system 142 publishes the contract data 144 with the updated contract state over a network to the matching engine 146. For example, the updated contract state may include the listing data structure elements such as the listing data and settlement date, etc. As discussed above, in one embodiment, each contract state or event may be a specified date and time, e.g. 4:00 PM Central Time (CT) on Nov. 11, 2019. In another embodiment, each state or event may be a specified blockchain block height, e.g. block 600,768.

At the matching engine 146, the matching engine 146 the matching engine updates its internal memory database, enables matching, order submission, order modification, and order cancellation for the contract(s) represented by the contract listing data structures.

The contract listing scheduler system 138 continuously monitors any updates the states and timing of the contract listing data structures that are published at the trading system 142. For example when contracts are set to expire and cease from trading, at the point the last trade event occurs, the contract listing scheduler system 138 publishes the updated contract state over a network to the trading system 142 to disable trading. The trading system 142 then records the updated contract state in the trading database. As previously described, the last trade event may be a specified date and time or a blockchain block height.

The exchange trading system 142 publishes the updated contract state over a network to the matching engine 146. The matching engine 146 updates its internal memory, disables matching, order submission, order modification, and order cancellation for the expiring contract(s) represented by the contract listing data structure. Further, the matching engine cancels all open orders in the trading system for the expiring contract(s) represented by the contract listing data structure. For example, as discussed above, the matching engine 146 may cancel open orders by updating its internal memory database to delete any open orders that still remain in its database.

FIG. 2 illustrates an example of an individual contract listing data structure 200 comprising a listing including example contract data. Turning now to the data fields in the contract listing data structure, the cryptocurrency data field 210, includes an identification of the specific cryptocurrency underlying the contract listing data structure 200. As shown in FIG. 2, the cryptocurrency is Bitcoin (BTC) all other cryptocurrencies such as Ethereum and Litecoin, may be employed. Next, in the contract size data field 220, the size of the contract is specified in terms of standardized hashrate and time, for example 100 Terahashes per second (TH/s).

Next, in the price quotation format data field 230, the format of the price quotation for the contract listing data structure 200 is specified. For example, the price quotation format may be in terms of Gigahashes (GH) or Terahashes (TH) of difficulty.

Next, in the minimum price increment data field 240, the minimum price that the value of the contract listing data structure 220 may be incremented or decremented during trading is shown. The minimum price increment is expressed in terms of units of difficulty, such as 10 GH.

Next, in the contract market value data field 250, the contract market value is calculated and stored according to the following formula, which shows a formulaic method of determining an expected mining reward. In the case of Bitcoin (BTC), for a given period of time and hashrate, one can calculate the expected mining reward, measured in quantity of coin, from a given difficulty level:

$$R = \frac{B * H * S}{D * N}$$

where R is the calculated expected reward, which may be used as an input to the market value of the contract;

B is the reward per block, which is defined by the blockchain protocol for the block interval the contract is listed at;

H is a specified hashrate or hashes per second. In the example of FIG. 2, H may be fixed at 100 TH/s as specified in the contract size data field 220;

S is the number of seconds over the calculation period. In one embodiment, the number of seconds in the calculation period may be fixed at 1,209,600 seconds or 14 days;

D is the difficulty level defined by the blockchain. This value is set by the specific blockchain on which the cryptocurrency is operating;

N is the range of the nonce value for a given blockchain. This value is also set by the specific blockchain on which the cryptocurrency is operating. In one example, the range of the nonce value may be N=4,294,967,296.

Thus, as shown in the equation, while the values of B, H, S, and N that are employed may be fixed for a specific contract, the difficulty level D may vary and the current value of R varies with the current difficulty level that is being mandated by the blockchain on which the cryptocurrency is being mined. As shown in the equation above, as the difficulty level increases, the value of R decreases. This reflects that as the difficulty level increases, the fixed amount of TH/s specified in the contract market value is less likely to result in the miner earning cryptocurrency because of the overall greater number of calculations that need to be performed to earn cryptocurrency. Conversely, as the difficulty level decreases, the value of R increases. Again, this reflects that as the difficulty level decreases, the fixed amount of TH/s specified in the contract market value is more likely to result in the miner earning cryptocurrency because of the overall lesser number of calculations that need to be performed to earn cryptocurrency. The difficulty level D may increase or decrease over the life of the contract.

Next, in the expiry date field 260, the expiry data of the contract listing data structure 200 may be set. As described herein, the expiry date may be determined by the Bitcoin block height. For example, the Bitcoin difficulty target is reset every 2,016 blocks. In one embodiment, expiry data may allow contract listing data structure 200 to be listed for 12 consecutive resets or a total of 24,192 blocks added to the blockchain.

Next, in the settlement method data field 270, the settlement method of the contract listing data structure 200 may be set. In one embodiment, settlement may take place by physically settling cryptocurrency on its respective blockchain to an account controlled by the customer. In another embodiment, settlement may take place by physically settling cryptocurrency within the books and record of the clearinghouse. In another embodiment, settlement may take place by cash settling the value of cryptocurrency in fiat currency within the clearinghouse books and records.

Finally, in the settlement procedures data field 270, the settlement procedures for the contract listing data structure 200 are specified. In one embodiment, the trading system may require that variation margin be exchanged daily in the underlying cryptocurrency (for example BTC) as determined by the daily contract settlement price. Additionally, final settlement may be based on the difficulty target level published by the Bitcoin blockchain following the difficulty reset at the specified block height. In this embodiment settlement is based on the newly set difficulty target at the time of settlement where the new target may be any one of lower, equal to, or higher that the previously set difficulty target that was determined at the creation of the contract data structure and the outcome of the contract to determine what the buyer or seller was owed, or owed at settlement may be based on the updated difficulty at the time of settlement, as specified in the contract data structure specification.

Figure 3:
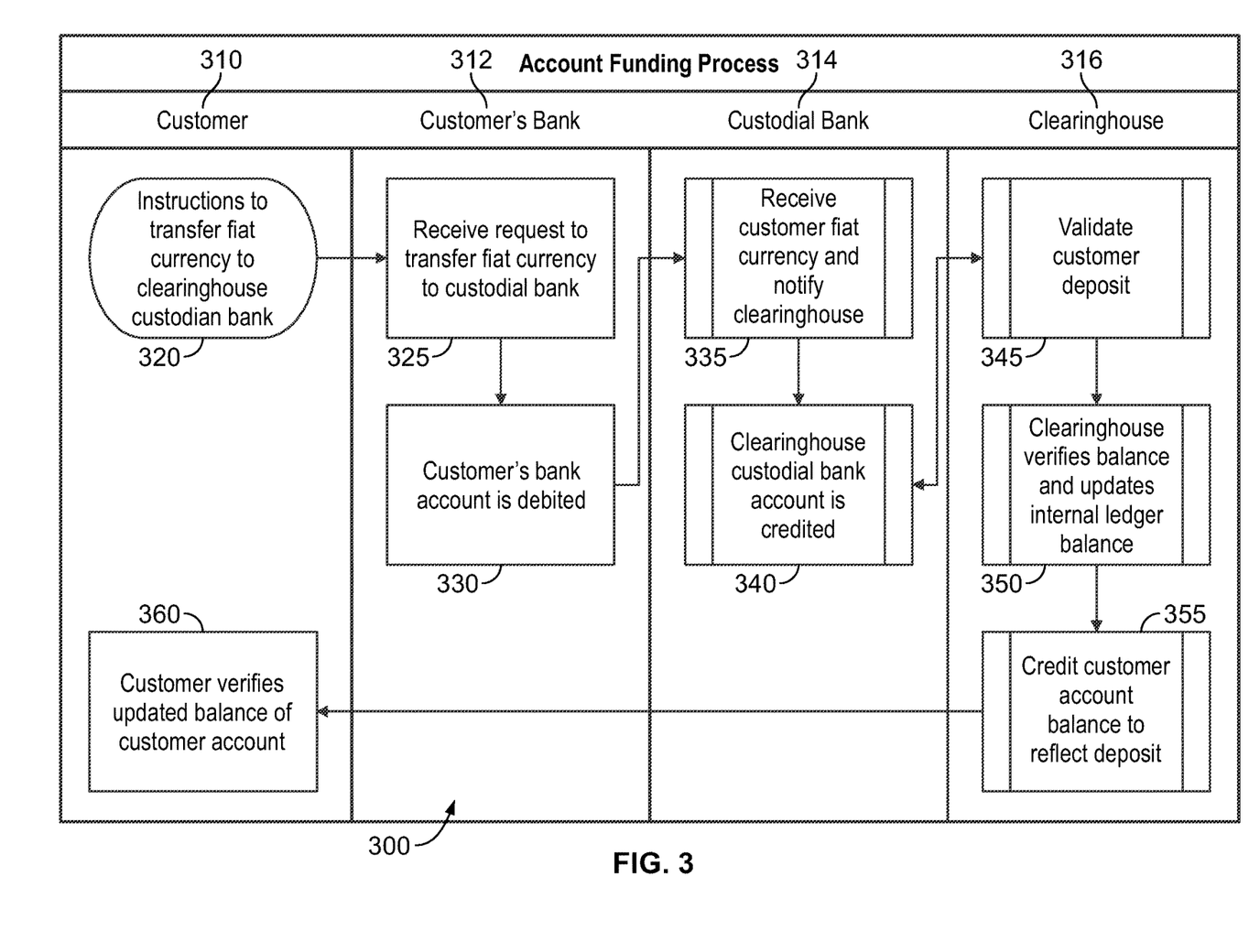
FIG. 3 illustrates an account funding process for the present trading system.

FIG. 3 illustrates an account funding process 300 for the present trading system. The account funding process includes a customer computer system 310, a customer's bank 312, a custodial bank 314, and a clearinghouse 316. Turning to the account funding process, first, at step 320, the customer 310 sends instructions to the customer's bank 312 to transfer fiat currency from the customer's bank 312 to the custodial bank 314. At step 325, the customer's bank 312 received the request from the customer 310. At step 330, the customer's bank 312 debits the customer's account in the amount requested and transfers the debited amount in fiat currency to the custodial bank 314.

Next, at step 335, the custodial bank 314 receives the fiat currency and notifies the clearinghouse 316. At step 340 the account at the custodial bank 314 that is owned by the clearinghouse 316 is credited with the customer's fiat deposit.

Then, at step 345, the clearinghouse validates the customer's deposit by confirming the corresponding balance increase in the clearinghouse's bank account at the custodial bank by, for example, the clearinghouse system sending a balance query over a network to the custodial bank's system. The custodial bank's system retrieves the balance from an account database and responds to the query over the network. Upon receipt of the response, the clearinghouse system updates its own internal account database with the new customer account balance. At step 350, the clearinghouse 316 verifies the balance in its account at the custodial bank 314 and updates an internal ledger database to reflect a new internal ledger balance. At step 355, the clearinghouse 316 credits the customer account at the clearinghouse 316 to reflect the customer's deposit. Finally, at step 360, the customer 310 verifies the updated balance at the customer's account, for example, by retrieving the customer's updated account data from the clearinghouse 316 and confirming it reflects the customer's instructions to the customer bank 312.

Thus, in one embodiment, in order to make trades using the trading system, the customer creates and funds an account with the exchange and clearinghouse. For example, the customer may submit a request to open an account from a system endpoint. For example, customers may submit the request using system endpoints such mobile applications, PC, server, etc. The system endpoints transmit the request information over a network to the exchange and clearinghouse system. Further, the customer request message may contain data such as name, personal identification number, address, telephone, bank information, cryptocurrency wallet address, etc.

At the exchange and/or clearinghouse account systems, these systems receive the customer's new account request, verify the customer's identification information, create the user account in the account database, and record the identification data in the account database. Next, the customer may verify account opening at the exchange and/or clearinghouse using the system endpoint. For example, the exchange and/or clearinghouse account systems may transmit a completion message over a network to the endpoint system and the system endpoint may display a completion message.

In another embodiment, the customer submits a request to transfer fiat from his/her bank account to the clearinghouse bank account from a system endpoint. For example, users may submit the request using system endpoints such mobile applications, PC, server, etc. The system endpoint then transmits the transfer request over a network to the user's bank. The request message may contain data such as bank account number, amount, currency, receiving bank account number, etc.

The customer bank system then receives the request, validates it, and processes the transfer instructions. For example, the customer bank system may validate that the customer has sufficient funds to transfer by querying the customer's account balance stored in an account database. If the customer does not have sufficient funds to implement the transfer, the customer bank system may send an error message to the customer.

The customer bank system then updates an internal transaction database to reflect transfer record. The customer bank system also updates customer account records stored in an account database to reflect account balance updates by reducing the customer account balance account database record by the transfer amount. The customer bank system may then issue a transfer request. The transfer request may be transmitted over a network to clearinghouse bank system.

At the clearinghouse bank system, the request is received and validates and the clearinghouse bank system processes the instructions and data elements of transaction. In one embodiment, the clearinghouse bank system updates a customer account balance stored in an account database to reflect account balance updates. For example, the clearinghouse bank system may record the inbound transfer in a transaction database and increase a clearinghouse account balance in the balance database record by the transfer amount. The clearinghouse bank system then sends the transaction record to a clearinghouse settlement system over a network. The transaction record/message may contain data such as bank account number, amount, currency, beneficiary account number, etc.

The clearinghouse settlement system then receives the transaction record from the bank system. The clearinghouse settlement system matches the customer/beneficiary account number to the customer's clearinghouse account number and updates the customer account balance that is stored in the balance database to reflect account balance updates. For example, the clearinghouse settlement system may increase the customer account balance in the balance database record by the transfer amount.

Finally, the customer verifies the updated balance of transferred fiat from the customer's bank account using the endpoint system. In one embodiment, the endpoint system transmits an account balance query over a network to the customer's bank system, the customer bank system then pulls the customer's account balance from an account database and responds to query. The customer endpoint system then receives the account balance query response and presents the balance data to the customer.

Figure 4:
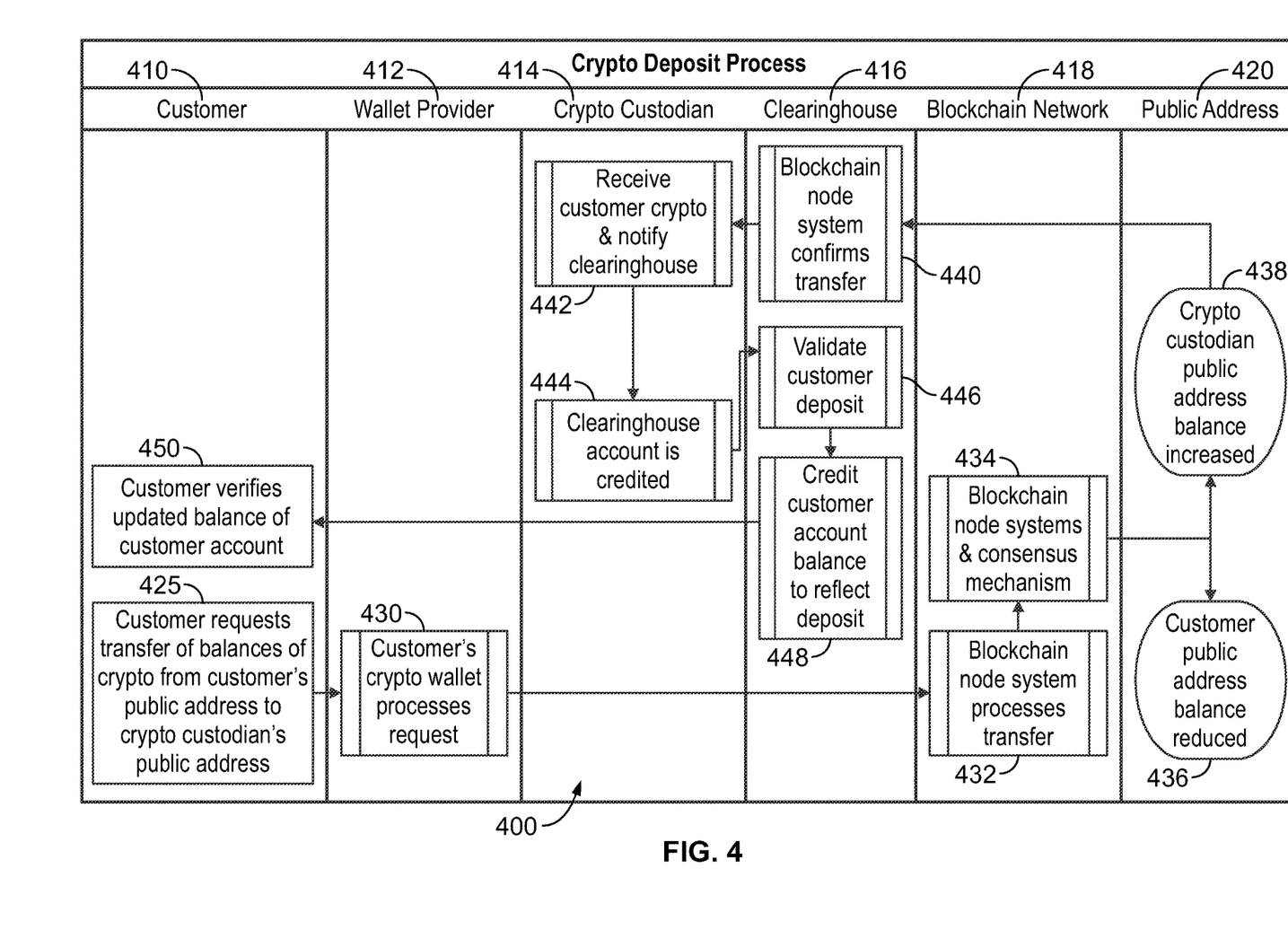
FIG. 4 illustrates a cryptocurrency deposit process for the present trading system.

FIG. 4 illustrates a cryptocurrency deposit process 400 for the present trading system. The cryptocurrency deposit process 400 includes a customer computer system 410, a cryptocurrency wallet provider 412, a cryptocurrency custodian 414, a clearinghouse 416, a blockchain network 418 and public addresses 420 on the blockchain network 418. Turning now to the cryptocurrency deposit process 400, first, at step 425, the customer 410 requests that their wallet provider 412 transfer an amount of cryptocurrency from the customer wallet's public address to the public address of the cryptocurrency custodian 414. Next, at step 430, the customer's cryptocurrency wallet at the wallet provider 412 processes the customer's request.

Next, at step 432, at the blockchain network 418, the transfer of cryptocurrency from the customer's public address to the cryptocurrency custodian's public address is processed. At step 434, the blockchain node systems and consensus mechanism confirms the transfer. At step 436, the customer's public address balance is reduced and at step 438, the cryptocurrency custodian's public address balance is increased. Then, at step 440, at the clearinghouse 416, the blockchain node system confirms the transfer. In one embodiment the blockchain node system may automatically send a message to the crypto custodian indicating the balance update. In another embodiment the crypto custodian 414 submits a balance request to the blockchain node system, and the blockchain node system responds with the updated balance.

At step 442, the cryptocurrency custodian 414 verifies the receipt of cryptocurrency from the customer at the cryptocurrency custodian 414 public address and notifies the clearinghouse 414. At step 444, the cryptocurrency custodian 414 sends an instruction to the clearinghouse 416 to credit the customer's account.

At step 446, the clearinghouse validates the customer's deposit by confirming the corresponding balance increase in the clearinghouse's crypto custody account at the crypto custodian by, for example, the clearinghouse system sending a balance query over a network to the crypto custodian's system. The crypto custodian's system retrieves the balance from an account database and responds to the query over a network. Upon receipt of the response, the clearinghouse system updates its own internal account database with the new customer account balance. Then, at step 448, the clearinghouse 416 credits the customer's cryptocurrency account balance to reflect the deposit of cryptocurrency. Finally, at step 450, the customer verifies that the expected updated balance appears in the customer account at the clearinghouse 416.

In one embodiment, customer submits a request to transfer cryptocurrency from his/her wallet to the clearinghouse wallet from a system endpoint. Users may submit the request using system endpoints such mobile applications, PC, server, etc. The system endpoint transmits the transfer request over a network to the user's wallet provider. The request message contains data such as wallet address, amount, cryptocurrency, receiving wallet address, etc. At the Blockchain Node System, the transfer instruction message is received and the wallet transmits cryptocurrency transfer instruction over a network to the Blockchain Node Systems.

The Blockchain Node Systems receive the cryptocurrency transfer message and process in accordance with blockchain computation methodology. The cryptocurrency transfer message may include: the amount of cryptocurrency to transfer, the public address to transfer from, and the public address to send cryptocurrency to. Additionally, the Blockchain Node Systems may confirm the sender address has sufficient cryptocurrency to cover the requested transfer and any associated fees. When the sender address does not have sufficient cryptocurrency, the blockchain consensus mechanism does not confirm the transaction. As a result, the Blockchain Node Systems does not transmit a balance update message to the clearinghouse blockchain node system and may transmit an error message to the customer's wallet. Additionally, the Blockchain Node Systems record cryptocurrency transfer transaction(s) to the blockchain database in accordance with mining/consensus methodology.

The clearinghouse digital custodian queries the Blockchain Node System over a network for transaction activity. Then, the Blockchain Node inspects the public address transaction activity on the blockchain in the Blockchain Database. The Blockchain Node transmits the transaction record over a network. The transaction record/message contains may contain transaction details including the amount, cryptocurrency, originating public address, etc. The clearinghouse digital custodian receives the transaction record and delivers it to the clearinghouse settlement system over a network. The clearinghouse settlement system then updates the account balance stored in an account database to reflect account balance updates. For example, the clearinghouse settlement system may increase a clearinghouse account balance in an account database record by the transfer amount.

The clearinghouse settlement system receives the transaction record from the digital custodian and matches the originating public address to the customer's clearinghouse account. For example, the customer non-clearinghouse wallet addresses may be obtained from the customer at account opening and stored in account database. The clearinghouse settlement system then updates the customer account balance stored in the balance database to reflect account balance updates, such as the transfer amount.

The Customer verifies the updated balance of transferred cryptocurrency on blockchain using the customer computer system endpoint system. In one embodiment, the endpoint system transmits an account balance query over a network to the Blockchain Node. The Blockchain Node then inspects the public address account balance of the customer on the blockchain in the Blockchain Database. The Blockchain Node then transmits account balance query response over a network to customer endpoint system. Finally, the customer endpoint system receives the account balance query response and presents the balance data to the customer.

Figure 5:
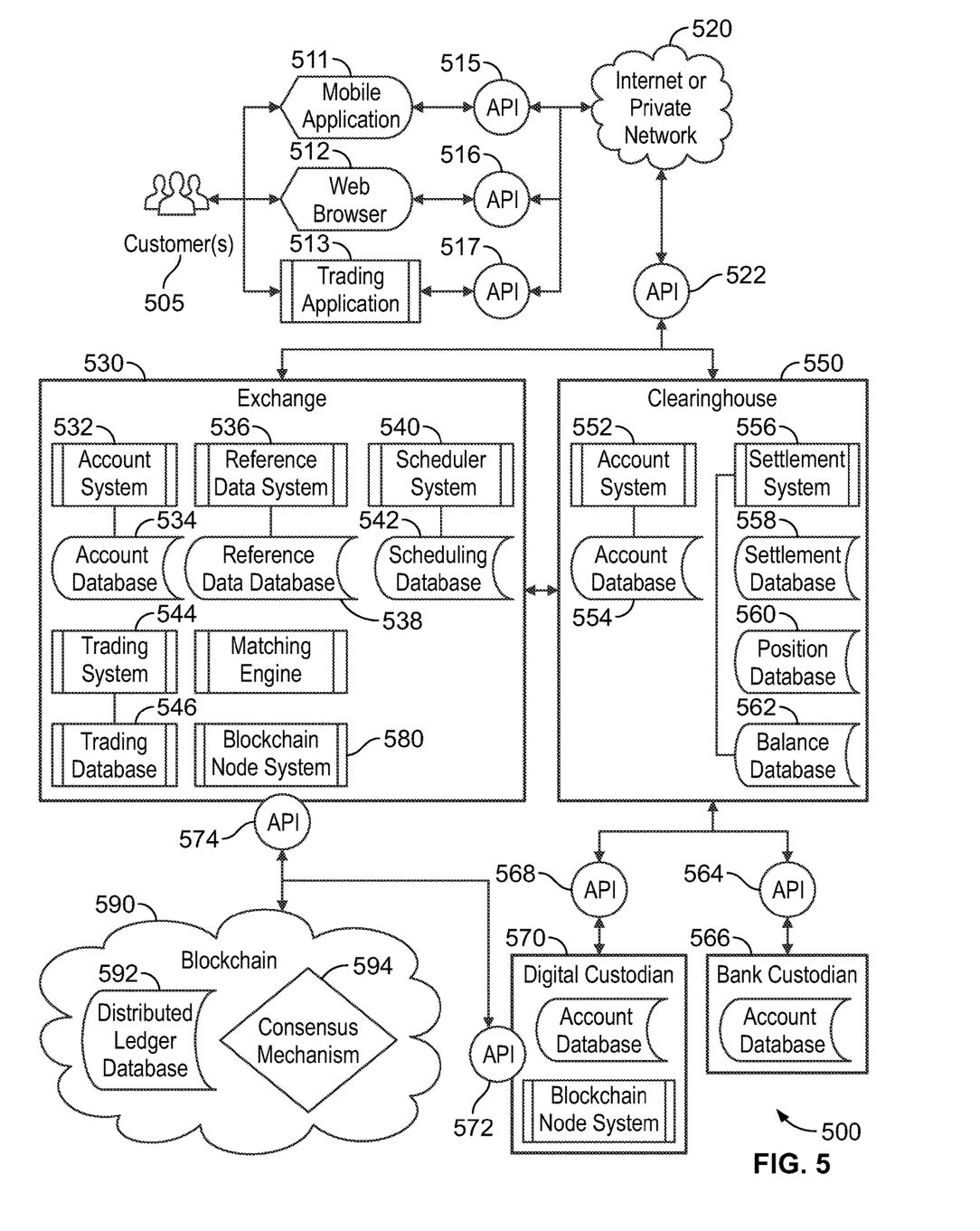
FIG. 5 illustrates a trading and clearing system according to an embodiment of the present invention.

FIG. 5 illustrates a trading and clearing system 500 according to an embodiment of the present invention. The trading and clearing system 500 includes customers 505, mobile application 511, web browser 512, and trading application 513 as well as their respective APIs 515-517, the internet or a private network 520, an electronic trading exchange 530, an electronic clearinghouse 550, a bank custodian system 566, a digital custodian system 570, a blockchain node system 580, and the blockchain 590. Although individual APIs are shown in FIG. 5, each of the APIs may be one or more APIs. As shown in FIG. 5, the electronic trading exchange 530 includes an exchange account system 532 and accompanying exchange account database 534, a reference data system 536 and accompanying reference data database 538, a scheduler system 540 and accompanying scheduling database 542, a trading system 544 and accompanying trading database, and a matching engine.

The electronic clearinghouse 550 includes a clearinghouse account system 552 and accompanying clearinghouse account database 554, as well as a settlement system 556 including a settlement database 558, a position database 560, and a balance database 562. The electronic clearinghouse 550 is connected to the bank custodian system 556 through the one or more APIs 564. The electronic clearinghouse 550 is connected to the digital custodian system 570 through the one or more APIs 568. The digital custodian system 570 is also in communication with the blockchain node system 580 through the API 572. The exchange system 530 is also in communication with the blockchain 590 through one or more APIs 574.

Blockchain 590 includes the distributed ledger database 592 and the consensus mechanism 594. The current difficulty value may be retrieved from the distributed ledger database 592 by the blockchain node system 580 of the exchange 530 through the API 574.

In operation a customer 505 submits an order to buy or sell contract(s) to the exchange system 530 from a system endpoint such as the mobile application 511 web browser 512, trading application 513, PC, server, etc. The system endpoint then transmits the order message over the network 520 to the exchange trading system 530. The trade message may contain data such as the user account, contract identifier, order type, quantity and price.

The exchange trading system 530 receives the message, validates it, and publishes the order to the matching engine. For example, the trading system may validate the contents of the message verifying the user account, the contract, order type, etc. The trading system 544 may store the order in the trading database 546.

The matching engine 548 attempts to match one or more orders to buy or sell stored in the trading database 546 based upon a system defined matching logic. Once the matching engine 548 matches two orders, the exchange trading system 530 delivers the details of the matched orders over a network to the clearinghouse system 550 for settlement. Details included in the message of the matched orders include information such as buyer/seller account, price, quantity, time of transaction, etc.

As mentioned above, the reference data system is used in setting up the listing contract data structures, which are then stored in the reference data database. Additionally, as discussed above, the scheduler system schedules the states of the listing contract data structures including: listing, first trade, last trade, expiry, and delisting. Finally, the account system is used to manage the customer's account at the exchange system 530, for example by recording the customer's trading, credit and risk limits, account name and/or ID number, and other account data related to systems configurations for the account such as instruments the account is enabled to trade, API configurations such as account password, and risk control settings such as a setting to cancel open orders upon a communication session disconnect.

Next, at the clearinghouse system 550, the clearinghouse system 550 receives the information from the matching engine 548 at the exchange system 530. The clearinghouse system 550 then performs the settlement process in the respective buyer and seller's accounts as follows. The clearinghouse system 550 validates and records the information from the matching engine 548 in the position database 560. The clearinghouse system 550 then checks if either buyer or seller account has an existing position in the contract represented by the contract listing data structure. When no position is found, the settlement system 556 creates a new record of the contract listing data structure with the customer's position in the position database 560. Conversely, when an existing position is found, the settlement system 556 updates the position quantity and the price of the position in the position database 560. The clearinghouse system 550 then calculates the settlement obligation for the buyer and seller and updates the account balances of the buyer and seller in the balance database 562. The clearinghouse system 550 then records the transaction in the settlement database 558.

The settlement details are also transmitted to the account system 552 of the clearinghouse system 550 where they may be retrieved and displayed for the customer 505.

Figure 6:
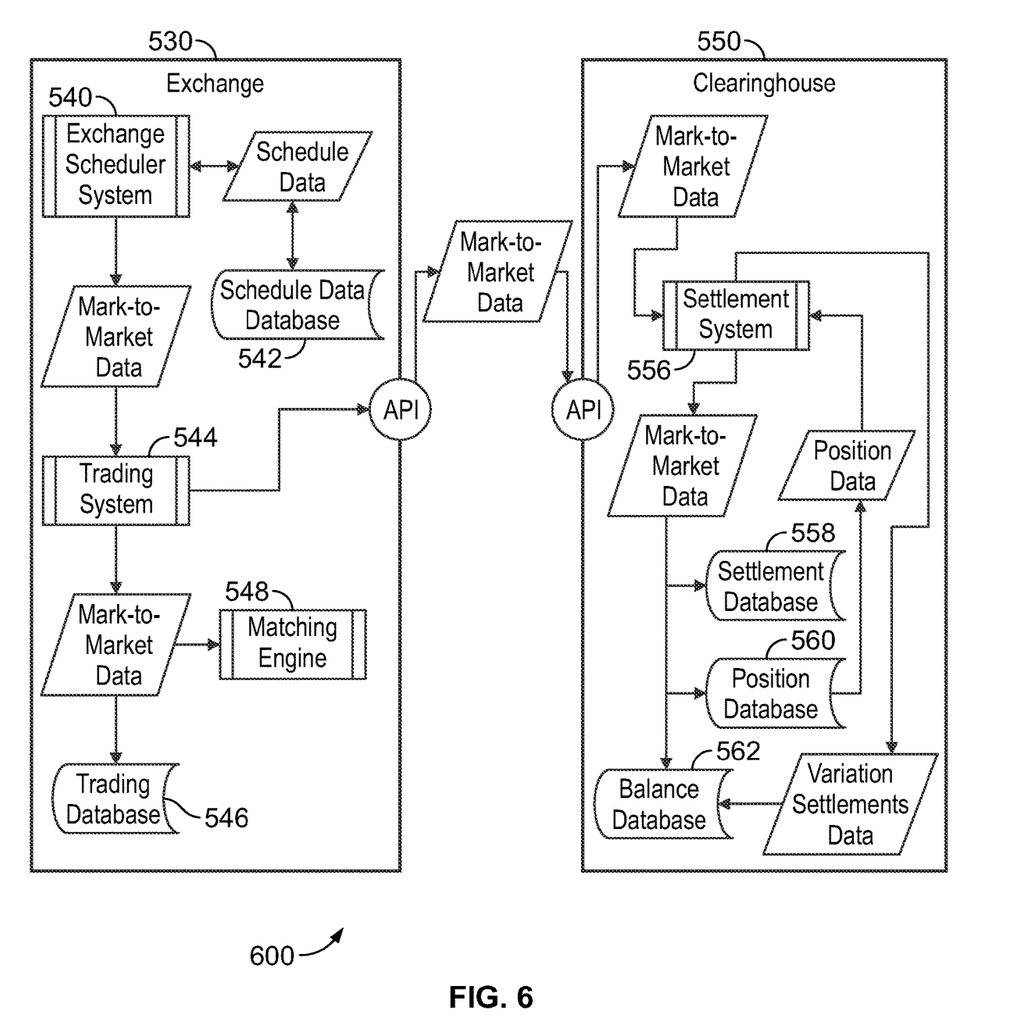
FIG. 6 illustrates the mark-to-market system according to an embodiment of the present invention.

FIG. 6 illustrates the mark-to-market system 600 according to an embodiment of the present invention. The mark-to-market system 600 includes the electronic exchange system 530 and the electronic clearinghouse 550 of FIG. 5. The exchange system 530 includes the exchange scheduler system 540, the scheduler data database 542, the electronic trading system 544, the trading database 546, and the matching engine 548. The electronic clearinghouse 550 includes the settlement system 556, the settlement database 558, the position database 560, and the balance database 562. Although individual APIs are shown in FIG. 6, each of the APIs may be one or more APIs.

In the mark-to-market system 600, open positions may be marked-to-market periodically, most commonly daily, and variation margin may be moved amongst accounts by the clearinghouse, for example updating its internal books and records to debit one or more accounts and credit one or more accounts. Turning now to the exchange trading system 530, the exchange trading system calculates a daily settlement price at a point in time based upon a calculation methodology as described below. The data defining the point in time for the calculation to occur is stored in a scheduler system's scheduling data database 542. In one example, the calculation may be a methodology implemented by a program stored in the trading system software. For example, the methodology may be to determine the volume weighted average price of all trades that have taken place in the contract represented by a specific contract listing data structure over the course of the last 24 hours.

At the exchange scheduler system 540, the settlement price calculation schedule is retrieved from the scheduling database 542. The exchange scheduler system 540 may then initiate the calculation of the settlement price using the trading system in accordance with the calculation procedure. An example of one embodiment is contract data in the schedule data database 542 indicating a mark-to-market price is to be calculated for a bi-weekly listed contract where the expiry date is Friday, Oct. 11, 2019, the subsequent listing is Friday, Oct. 23, 2019 and so forth. In an alternative embodiment, contract data in the schedule data database 542 may indicate that the mark-to-market price is to be calculated for Bitcoin-based contracts where expiry occurs at block height 598,752, block height 600,768 and so forth.

In one embodiment, the exchange trading system 530 calculates the daily mark-to-market price for each active contract listing. This calculation may be executed by software in the trading system 530. As discussed above, the mark-to-market price calculation procedure may include an algorithm such as a volume-weighted average price (VWAP) calculated from trades between a defined time period. The data inputs required to complete this calculation may be stored and/or retrieved from one or more databases in the exchange system 530 including, for example the schedule data database 542, the trading database 546 containing transaction level trade history, or other system database. As further described below, an example of the settlement price value generated from this calculation for the contract listed in FIG. 2 is 13,000 gigahashes. This value would be used as value D in the contract formula in FIG. 2.

The exchange trading system 530 also records the daily settlement price data in the trading database 546, publishes the settlement price data to the matching engine system 548, and publishes the daily settlement price data over a network to the clearinghouse system 550.

At the clearinghouse system 550, the settlement system 556 receives the daily settlement price data and stores it in the settlement database 558. The settlement system 556 also initiates a calculation of the variation margin requirement for each customer account. In one embodiment, the settlement system 556 initiates the variation margin calculation at the time in which it receives the settlement price from the trading system 530. In another embodiment, the settlement system 550 has a predefined scheduled point in time to determine the variation margin, wherein the predetermined time may be stored in the settlement database 558.

The settlement system 556 calculates the new contract market value based upon the contract formula using the daily settlement price data. An example of the reference market value formula can be found FIG. 2. The values for the market value formula (B, H, S, and N) are created and stored in the reference data database 538 at the time of contract creation as described above. As the sole variable in the price determination equation, the value of data component D at the time of settlement controls the variable settlement price used in the calculation obtained from the trading system as described above.

A simplified example of the per contract market value calculation output is as follows:

$$0.02707999 = \frac{12.5 * 100 * 10^{12} * 1,209,600}{13,000 * 10^9 * 4,294,967,296}$$

where the per contract market value, e.g., reward (R), for the given price, e.g., difficulty level (D), of 13,000 is 0.02707999 BTC;

12.5 is the BTC block reward (B);

100 terahashes per second (TH/s) is the contract size (H) and $10^{12}$ is equal to 1 terahash (TH);

S is the length in time of the contract of 1,209,600 seconds or 14 days;

the contract price is denominated in gigahases of Difficulty (D) and $10^9$ is equal to 1 gigahash (GH);

and the range of the nonce value for the blockchain is 4,294,967,296.

As described above, the value of the expected reward D is the only thing that is changing. Consequently, this enables hedging of the risk of an adverse/increasing change in difficulty. Block reward B may change eventually, but the change in block reward is a predetermined, scheduled event that takes place at a specified block height. Consequently, the change in B may be avoided as a risk by structuring the contract to only take place when B is constant.

Conversely, D is determined by the blockchain at intervals. Thus, the value of the expected reward varies depending on what happens when D is updated: D could go up, go down, or stay the same. When the contract spans multiple D resets, and the value of D changes at a reset, then the value of the contract also shifts and the present system shifts variation margin based on the change in difficulty of the most recent interval. Finally, at settlement, the contract is valued for settlement based on the difficulty at the last interval prior to settlement. D may be retrieved directly from the blockchain.

The settlement system 556 proceeds to calculate the variation margin for each customer account based upon the account's position, i.e. long or short. In one embodiment, the settlement system 556 retrieves the account position data from the position database 560. The settlement system 556 then calculates the variation margin requirement as the change in position market value between the market value stored in the position database 560 and the newly calculated market value.

In one embodiment, the variation margin settlement takes place in the form of the underlying cryptocurrency of the contract. For example, as described below, the calculated difference between the stored market value and the newly determined market value represents the variation margin which needs to be settled. The following table illustrates an example where the variation margin has been determined to be 0.10029628 BTC for each account for the contract referenced in FIG. 2. As mentioned above, the difficulty level D may vary when reset by the blockchain. In this example, the difficulty level has changed from a previous settlement value of 13,000 to its current settlement value of 13,500. Because the difficulty level has increased, the expected reward, and thus market value, of the contract goes down.

| Account | Acct 1 | Acct 2 |
|---|---|---|
| Direction | Long | Short |
| Quantity | 100 | 100 |
| PreviousSettle | 13000 | 13000 |
| CurrentSettle | 13500 | 13500 |
| PreviousValue | 2.70799949 | 2.70799949 |
| CurrentValue | 2.60770321 | 2.60770321 |
| VariationMargin | 0.10029628 | −0.10029628 |

In this example, Customer Account #1 is long 100 contracts and Customer Account #2 is short 100 contracts. The previous day's settlement price was 13,000 GH of Difficulty (which yielded a value of 2.70799949 BTC using the calculation shown in FIG. 2) and the current day's settlement price is 13,500 GH of Difficulty (which yields a value of 2.60770321 BTC using the calculation shown in FIG. 2).

Thus, the change in position value for both accounts is 0.10029628 BTC. Because Customer Account #1 is long, Customer Account #1 receives the variation margin due to the increase in the price, i.e. difficulty, and because Customer Account #2 is short, Customer Account #2 must pay the variation margin. Thus, Customer Account #2 is debited 0.10029628 BTC and Customer Account #1 is credited 0.10029628 BTC. These credits and debits are then recorded in the balance database 562, which stores the account balances of the buyer and seller. When the customer account does not have enough BTC to satisfy variation margin, the present system may generate a margin call to the client. Additionally, for a specific contract, the system may be configured to require the payment of the margin call in the underlying cryptocurrency, or require the payment of the margin call in fiat currency, or may allow the customer paying the margin call to choose whether to pay it in the underlying cryptocurrency or in fiat.

In another embodiment, the variation margin settlement takes place in the form of fiat currency of the fiat denomination of the contract, e.g. U.S. Dollar, etc. Similar to the example above, in the table below, the difficulty level has also changed from a previous settlement value of 13,000 to its current settlement value of 13,500. Because the difficulty level has increased, the expected reward, and thus market value, of the contract goes down. The entries for Direction, Quantity, PreviousSettle, CurrentSettle, PreviousValue, CurrentValue, and VariationMargin are thus the same as the table above. However, PreviousFiat, CurrentFiat, PreviousValueFiat, CurrentValueFiat, and VariationMargin Fiat have been added. PreviousFiat is the fiat denominated mark-to market value of one unit of the cryptocurrency at the last mark-to-market, and CurrentFiat is the fiat denominated mark-to-market value of one unit of the cryptocurrency at the current mark-to-market. The PreviousValueFiat is the fiat denominated value of the position calculated as the PreviousValue multiplied by the PreviousFiat. The CurrentValueFiat is the fiat denominated value of the position calculated as the CurrentValue multiplied by the CurrentFiat. The VariationMarginFiat is the difference between the PreviousValueFiat and the CurrentValueFiat expressed in fiat currency, such as dollars.

The following table illustrates an example where the variation margin has been determined to be $616.82 for each account for the contract referenced in FIG. 2, based on a previous price for BTC of $7,450.00 and a current price for BTC of $7,500.00.

| Account | Acct 1 | Acct 2 |
|---|---|---|
| Direction | Long | Short |
| Quantity | 100 | 100 |
| PreviousSettle | 13000 | 13000 |
| CurrentSettle | 13500 | 13500 |
| PreviousFiat | 7,450.00 | 7,450.00 |
| CurrentFiat | 7,500.00 | 7,500.00 |
| PreviousValue | 2.70799949 | 2.70799949 |
| CurrentValue | 2.60770321 | 2.60770321 |
| VariationMargin | 0.10029628 | −0.10029628 |
| PreviousValueFiat | 20,174.60 | 20,174.60 |
| CurrentValueFiat | 19,557.77 | 19,557.77 |
| VariationMarginFiat | 616.82 | −616.82 |

To determine the fiat equivalency of the variation margin settlement, the settlement system performs a conversion to fiat as part of its settlement calculation. The settlement system additionally receives and stores a cryptocurrency-to-fiat price from the trading system from the reference data database as part of the settlement price publishing process. These credits and debits are then recorded in the balance database 562, which stores the account balances of the buyer and seller. In one embodiment the crypto-to-fiat price is added to the reference data database by the trading system based on, for example, recent trade(s) of crypto-currency for fiat currency, for example BTC vs USD, on one or more reference markets. In one embodiment the reference market may be a single market, such as ErisX's spot market. In another embodiment the reference may be an index of spot markets. The trading system may receive the crypto-to-fiat price from the source, market or index provider, over a network and add the crypto-to-fiat price to the reference data database.

As mentioned above, the variation margin settlements take place and are recorded to customer accounts on a predefined schedule, as set in the settlement database 558. In one embodiment, the movements between customer accounts are initiated at the time the settlement system has completed the variation margin calculation. In another embodiment, the movements between customer accounts take place at a defined point in time, such as midnight, for example.

As mentioned above, updates to the customer account balances are then stored in the balance database 563 to reflect the variation margin settlements. Thus, the customer accounts may be increased or decreased for each asset or contract owned by the customer based on the contract's variation margin settlement. Additionally, when the customer account does not have enough fiat currency to satisfy variation margin, the present system may generate a margin call to the client. Additionally, for a specific contract, the system may be configured to require the payment of the margin call in the underlying cryptocurrency, or require the payment of the margin call in fiat currency, or may allow the customer paying the margin call to choose whether to pay it in the underlying cryptocurrency or in fiat.

Figure 7:
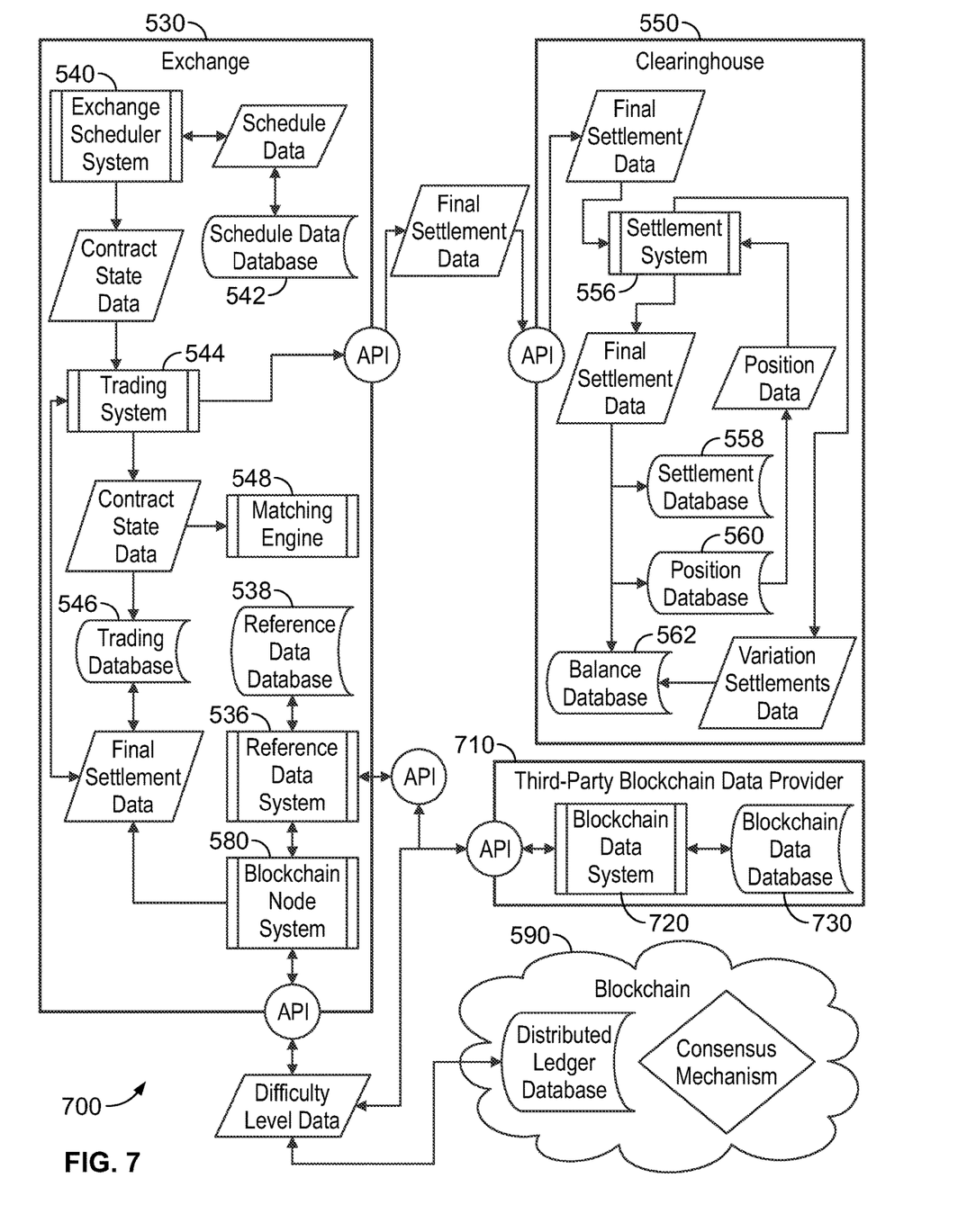
FIG. 7 illustrates final settlement system according to an embodiment of the present invention.

FIG. 7 illustrates final settlement system 700 according to an embodiment of the present invention. The final settlement system 700 includes the electronic exchange system 530 and the electronic clearinghouse 550 of FIG. 5. The exchange system 530 includes the exchange scheduler system 540, the scheduler data database 542, the electronic trading system 544, the trading database 546, the matching engine 548, the reference data database 538, the reference data system 536, and the blockchain node system 580. The electronic clearinghouse 550 includes the settlement system 556, the settlement database 558, the position database 560, and the balance database 562. Also shown in FIG. 7 are the blockchain 590 including the distributed ledger database 592 and consensus mechanism 594, as well as a third-party blockchain data provider 710 including a blockchain data system 720 and a blockchain data database 730. Although individual APIs are shown in FIG. 7, each of the APIs may be one or more APIs.

In operation, at the final settlement of a contract, its price is determined from the difficulty target level published by the blockchain of the underlying cryptocurrency for a given contract. The final settlement process begins at the exchange scheduler system 540, when it is determined for a specific contract listing data structure that the current time matches the predetermined expiry time associated with the contract listing data structure. At that time, the exchange scheduler system 540 transmits the change in contract state data to the trading system 544. Stated another way, the exchange scheduler system 540 sets the contract to process a final settlement and initiates the trading system to update the contract state in the trading database 546 and retrieve the data in the trading database 546 for final settlement. As mentioned above, the point in time for the data extraction to occur is defined in the scheduling database 542 of the scheduler system 540. As previously described, the expiry and/or last trade event may be a specified date and time or a blockchain block height.

Next, the exchange trading system 544 obtains the difficulty level for the contract period. In one embodiment, the difficulty level is obtained directly from the blockchain. For example, the reference data system 536 may transmit a request for the difficulty level to the blockchain node system 580. The blockchain node system may then receive the request, retrieve the difficulty level from blockchain software, and return the difficulty level. As mentioned above, when the contract spans only a single difficulty reset, the difficulty is static. However, when the contract spans two or more resets, and the difficulty level is reset, the value of the contract is adjusted.

In another embodiment, the difficulty level is obtained from a third-party blockchain data provider 710 who specializes in blockchain data. In this embodiment, the reference data system 536 may transmit a request through one or more APIs to the third-party blockchain data provider 710. The third-party blockchain data provider 710 may retrieve the difficulty data from the blockchain data database 730 associated with its blockchain data system 720 and then return the difficulty data to the blockchain node system 580, which may in turn transmit the difficulty information to the reference data system 536. The blockchain data system 720 may have previously retrieved the difficulty level data from the distributed ledger database and stored it in the blockchain data database. As mentioned above, the present system uses the most recent difficulty level value to determine contract valuation.

Next, the exchange trading system 544 converts the difficulty level to the contract price format. For example for the contract referenced in FIG. 2, if the difficulty level at the time of final settlement is 13,750,000,000,000 the trading system will convert and store the final settlement price as 13,750 (GH). The exchange trading system 544 records the final settlement price in the trading database 546 and publishes the final settlement price over a network to the clearinghouse system 550.

The clearinghouse system 550 receives the final settlement price and stores it in the settlement database 558. The clearinghouse system 550 then initiates a calculation of the final settlement obligation requirement for each account. In one embodiment, the settlement system 556 initiates the final settlement calculation at the time in which it receives the settlement price from the trading system 530. In another embodiment, the settlement system 556 initiates the final settlement calculation at a predetermined point in time, such as midnight, for example.

The settlement system 556 then calculates the final contract market value, i.e. reward, based upon the contract formula of FIG. 2 using the final settlement price. Continuing the example from above wherein a previous settlement price of 13,000 had risen to a current settlement price of 13,500, consider an example wherein final settlement price has now been determined to be 13,750. For this final settlement price, using the formula shown in FIG. 2 and as further described below, the final contract market value is 0.02560290 BTC.

The settlement system 556 calculates the final settlement obligation for each account based upon the account's position, i.e. long or short. For each account, the settlement system 556 retrieves the account position data from the position database 560. In one embodiment where variation margin settlements are in physical cryptocurrency, the final settlement obligation is calculated as a final variation margin settlement based upon the change in position market value.

Similar to the mark-to-market example shown above, a simplified example calculation of the final settlement for the contract referenced in FIG. 2 is as follows:

| Account | Acct 1 | Acct 2 |
|---|---|---|
| Direction | Long | Short |
| Quantity | 100 | 100 |
| PreviousSettle | 13500 | 13500 |
| CurrentSettle | 13750 | 13750 |
| PreviousValue | 2.60770321 | 2.60770321 |
| CurrentValue | 2.56029042 | 2.56029042 |
| VariationMargin | 0.04741279 | −0.04741279 |
| FinalSettle | 0.04741279 | −0.04741279 |

In this example, Customer Account #1 is long 100 contracts and Customer Account #2 is short 100 contracts. The previous day's settlement price was 13,500 GH of Difficulty (which yielded a value of 2.60770321 BTC using the calculation shown in FIG. 2) and the current day's settlement price is 13,750 GH of Difficulty (which yields a value of 2.56029042 BTC using the calculation shown in FIG. 2). Thus, the change in position value for both accounts is 0.04741279 BTC. Because Customer Account #1 is long, Customer Account #1 receives the variation margin due to the increase in the price, i.e. difficulty, and because Customer Account #2 is short, Customer Account #2 must pay the variation margin. Thus, Customer Account #2 is debited 0.04741279 BTC and Customer Account #1 is credited 0.04741279 BTC. These credits and debits are then recorded in the balance database 562, which stores the account balances of the buyer and seller. As mentioned above, when the customer account does not have enough BTC to satisfy variation margin, the present system may generate a margin call to the client. Additionally, for a specific contract, the system may be configured to require the payment of the margin call in the underlying cryptocurrency, or require the payment of the margin call in fiat currency, or may allow the customer paying the margin call to choose whether to pay it in the underlying cryptocurrency or in fiat.

Similar to that described above for the mark-to-market calculation, in another embodiment where variation margin settlements are in the form of fiat currency of the fiat denomination of the contract, the final settlement obligations are calculated as a physical delivery of cryptocurrency and fiat settlements. For example, building off the example discussed above, in the table below, TradePrice, TradeFiat, TradeValue, and TradeValueFiat, have been added. TradePrice is the price at which the contract was first traded between the two parties, 13,000 in this case. TradeFiat is the fiat denominated mark-to-market value of one unit of the cryptocurrency on the date it was first traded. TradeValue is the value provided using the calculation shown in FIG. 2. TradeValueFiat is the fiat denominated value of the position calculated as the TradeValue multiplied by the TradeFiat.

| Account | Acct 1 | Acct 2 |
|---|---|---|
| Direction | Long | Short |
| Quantity | 100 | 100 |
| TradePrice | 13000 | 13000 |

-continued

| Account | Acct 1 | Acct 2 |
|---|---|---|
| PreviousSettle | 13500 | 13500 |
| CurrentSettle | 13750 | 13750 |
| TradeFiat | 7,450.00 | 7,450.00 |
| PreviousFiat | 7,500.00 | 7,500.00 |
| CurrentFiat | 7,475.00 | 7,475.00 |
| TradeValue | 2.70799949 | 2.70799949 |
| PreviousValue | 2.60770321 | 2.60770321 |
| CurrentValue | 2.56029042 | 2.56029042 |
| TradeValueFiat | 20,174.60 | 20,174.60 |
| PreviousValueFiat | 19,557.77 | 19,557.77 |
| CurrentValueFiat | 19,138.17 | 19,138.17 |
| FinalSettle | 0.14770906 | −0.14770906 |
| FinalSettleFiat | −616.82 | 616.82 |

In this example Customer Accounts #1 and #2 have an original trade price of 13,000. With a final settlement price of 13,750, this results in a difference in reward of 0.14770906 BTC for each account's position. Customer Account #2 is short and with an increase in price, i.e. increase in difficulty, Customer Account #2 is obligated to deliver the reward difference with physical BTC.

Because previous variation margin settlements were collateralized in fiat currency, for example, U.S. dollars, previous variation margin is now repaid into the clearinghouse. For example, the previous cumulative variation margin settlements totaled to $616.82 for each account, with Customer Account #1 receiving the fiat gains. Consequently, Customer Account #1 is obligated to return $616.82 to the clearinghouse.

As mentioned above, the settlement system 556 stores the final settlement calculation output in the settlement database 558 for each Customer Account and for each contract. As mentioned above, final settlement adjustments for Customer Accounts may take place on a predefined schedule stored in the settlement database 558. For example, final settlement adjustments for Customer Accounts may be initiated at the time the settlement system has completed the final settlement obligation calculation. Alternatively, final settlement adjustments for Customer Accounts may take place at a predetermined time stored in the settlement system, such as midnight for example. The settlement system updates the customer account balances stored in the balance database to reflect the final settlements by increasing or decreasing the customer account balances for each asset based on the customer account's final settlement obligation. Additionally, when the customer account does not have enough fiat currency to satisfy variation margin, the present system may generate a margin call to the client. Additionally, for a specific contract, the system may be configured to require the payment of the margin call in the underlying cryptocurrency, or require the payment of the margin call in fiat currency, or may allow the customer paying the margin call to choose whether to pay it in the underlying cryptocurrency or in fiat.

Thus, using the present system, a cryptocurrency miner has the opportunity to sell at a fixed price one or more contracts representing either all or a portion of their actual number of TH/s performed by their mining hardware. As noted above, due to the probabilistic rather than deterministic nature of cryptocurrency mining, the miner is not certain in advance as to how much cryptocurrency will actually be awarded to them due to their mining operations and the amount of cryptocurrency may be greater or lesser than the sale price of their contracts under the present system. Additionally, the miner is not certain in advance as to the dollar value of any cryptocurrency that will actually be awarded to them due to mining operations because the market price of the cryptocurrency may vary. However, once the cryptocurrency miner has sold the one or more contracts, then for the portion of the TH/s provided by their mining hardware represented by the one or more contacts, the miner's dollar value is known and fixed as the price the miner receives for the one or more contracts. The ability of a cryptocurrency miner to achieve revenue stability by selling contracts using the present system is highly desirable to the cryptocurrency miner. This is because miners typically have fiat denominated liabilities in the form of payroll, electricity costs, and other operational overhead. If miners are fully exposed to the risks of fluctuations in the value of their production with no ability to manage the price/market/difficulty risks, they run the risk that the revenue of their production will not be sufficient to cover their operating expenses and/or it makes financial forecasting and planning more risky and difficult. These are similar to risks faced by more traditional commodities producers such as farmers, precious and base metals miners, oil producers and other companies subject to fluctuating market prices for their output.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A financial instrument trading system, said system including:
   a computerized exchange determining a first market value for a cryptographic difficulty-based financial instrument based on an underlying cryptocurrency operating on a blockchain-enabled cryptocurrency computerized system, wherein said cryptocurrency computerized system has the properties of:
   B is the predetermined reward per block of cryptocurrency, which is defined by the blockchain protocol for the block interval of said underlying cryptocurrency,
   S is the length in seconds of a predetermined calculation period defined by the blockchain protocol for said underlying cryptocurrency,
   D is the current difficulty level set by the blockchain protocol for said underlying cryptocurrency when said first market value is determined and electronically received by said computerized exchange,
   wherein said difficulty level is periodically automatically updated by said blockchain protocol,
   wherein said difficulty level represents a maximum numeric hash value for determining a successful cryptographic hash of said block of cryptocurrency, and
   N is the range of the nonce value as defined by the blockchain protocol for said underlying cryptocurrency;
   wherein H is a predetermined hashrate that is electronically stored at said computerized exchange,
   wherein said computerized exchange determines said first market value as:

$$R = \frac{B*H*S}{D*N}$$

where R is said first market value,
an electronic clearinghouse including a position database including a computerized customer account, wherein said computerized customer account is electronically associated with a trading position in said cryptographic difficulty-based financial instrument electronically associated with said first market value;
said electronic clearinghouse electronically determining that the current value of D for the blockchain protocol for said underlying cryptocurrency is different from the value of D used in determining said first market value of said cryptographic difficulty-based financial instrument, and
said electronic clearinghouse further automatically determining a new market value for said cryptographic difficulty-based financial instrument using said current value of D to determine R,
said electronic clearinghouse electronically further automatically retrieving said computerized customer account including said trading position and said first market value and,
when said computerized customer account indicates a short position in said cryptographic difficulty-based financial instrument and said new market value is greater than said first market value,
said electronic clearinghouse receives an electronic transfer of said underlying cryptocurrency from a cryptocurrency wallet electronically associated with said computerized customer account to a cryptocurrency wallet electronically associated with said electronic clearinghouse, wherein the value of said underlying cryptocurrency that is transferred is equal to the difference between said first market value and said new market value, and
when said computerized customer account indicates a short position in said cryptographic difficulty-based financial instrument and said new market value is lesser than said first market value,
said electronic clearinghouse automatically initiates an electronic transfer of said underlying cryptocurrency to said cryptocurrency wallet electronically associated with said computerized customer account from said cryptocurrency wallet electronically associated with said electronic clearinghouse, wherein the value of said underlying cryptocurrency that is transferred is equal to the difference between said first market value and said new market value.

2. The system of claim 1 wherein said underlying cryptocurrency is Bitcoin.

3. The system of claim 1 wherein the value of H is 100 TH/s.

4. The system of claim 1 wherein the value of S is 1,209,600.

5. The system of claim 1 wherein the value of N is 4,294,967,296.

6. The system of claim 1 wherein said difficulty level is updated after 2016 blocks of said cryptocurrency.

* * * * *